J. S. SHELLY.
HORSE-POWER.
No. 188,821. Patented March 27, 1877.
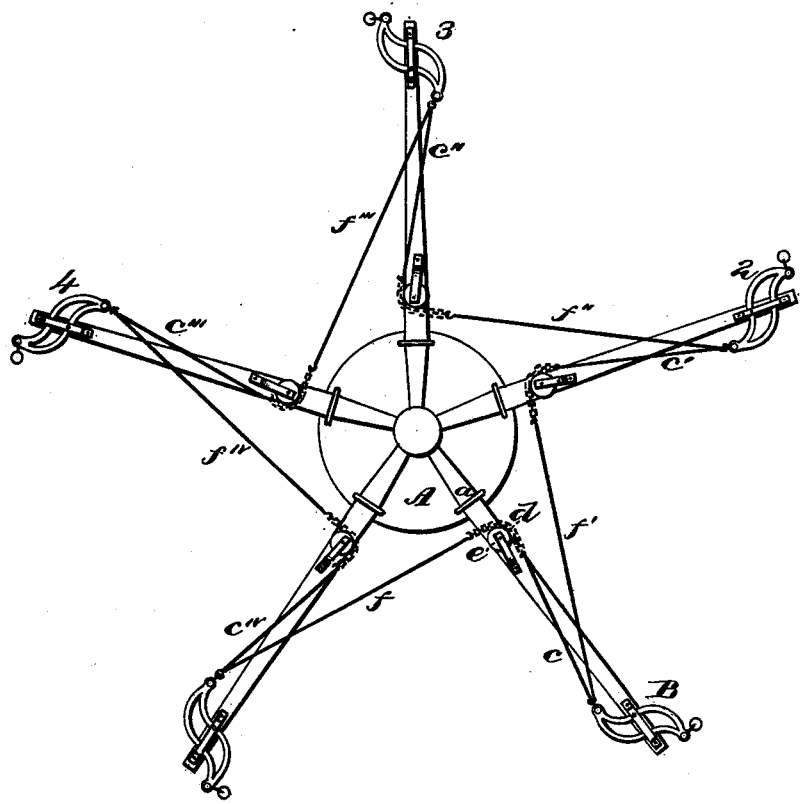
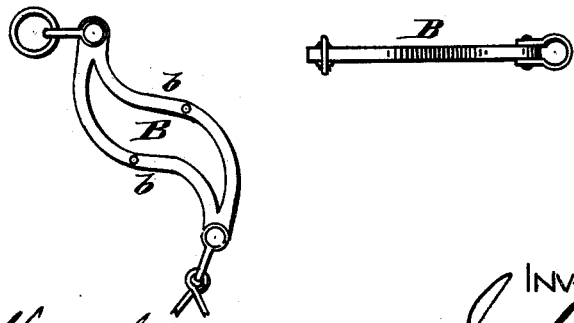

UNITED STATES PATENT OFFICE.

JACOB S. SHELLY, OF SHANNON, ILLINOIS.

IMPROVEMENT IN HORSE-POWERS.

Specification forming part of Letters Patent No. 188,821, dated March 27, 1877; application filed February 12, 1877.

*To all whom it may concern:*

Be it known that I, JACOB S. SHELLY, of Shannon, in the county of Carroll, and State of Illinois, have invented certain new and useful Improvements in Horse-Powers; and I do hereby declare that the following is a full, clear, and exact description thereof, which will enable others skilled in the art to which it appertains to make and use the same.

This invention is in the nature of an improvement in the draft-bars of draft-equalizers for horse-powers.

The invention consists in a double segmental reversible draft-bar, somewhat of the shape of an S, by which construction the bar is rendered more durable, is stronger, and its reversibility admits of longer wear, inasmuch as that when one limb becomes worn or is weakened, the fulcral bolt may be inserted through the other limb and the bar used as before, thus rendering a new bar unnecessary.

In the drawings illustrating my invention, Figure 1 is a plan view of the draft mechanism of a horse-power embodying my invention, and Fig. 2 shows in plan and edge views my improved draft-bar.

The letter A designates the drum or equivalent support attached to the main shaft, and receiving the poles $a\ a$. At the outer ends of the poles are suitably attached draft-bars B of double segmental or S shape, having two limbs, $b\ b$, in each of which a hole is made, through either of which the fulcral bolt is passed to secure said bars to the poles. One end of these bars is provided with a trace-hook to which the horse is hitched; and from the opposite end a short rod, $c$, extends inwardly, and is connected by a chain, $d$, passing over a pulley, $e$, on the pole, with a longer rod, $f$, secured to an adjacent draft-bar. The long rod $f'$ of the first-named draft-bar is connected with the short rod $c'$ of the draft-bar 2. The long rod $f''$ of bar 2, with short rod $c''$ of bar 3, the long rod $f'''$ of bar 3, with the short rod $c'''$ of bar 4, and the long rod $f^{iv}$ of bar 4, with the short rod $c^{iv}$ of bar 5, or otherwise, these connections being here specifically described, in order that a draft-equalizing mechanism of approved construction may be herein defined in connection with my draft-bars. The draft-bars, as already described, have a bolt-hole in each limb, the object of which is to permit the reversing of the bars, as one limb becomes worn or is weakened by use. To accomplish this reversal, the bars to be reversed, have their bolts removed, and the opposite limb placed in position to receive the bolt, the necessary adjustments of the rods and hitching devices being also made at the same time—that is to say, changed to opposite ends of the bars. By this construction, the bar is rendered more lasting, and by giving it the double segmental or S shape it is much stronger, it being understood that each half of the S constitutes one segment, and the complete S shape gives the double segmental form.

What I claim is—

1. The above-described double segmental and reversible draft-bar, constructed substantially as specified.

2. The combination of the double segmental and reversible draft-bars B, short rods $c\ c'$, &c., long rods $f\ f'$, &c., chains $d$, and pulleys $e$, substantially as and for the purpose described.

In testimony that I claim the foregoing as my own I affix my signature in presence of two witnesses.

JACOB S. SHELLY.

Witnesses:
  ISAAC SWEIGARD,
  A. W. DEAL.